(12) United States Patent
Sonoda

(10) Patent No.: US 12,223,058 B2
(45) Date of Patent: Feb. 11, 2025

(54) SECURITY INSPECTION APPARATUS, SECURITY INSPECTION METHOD, AND PROGRAM

(71) Applicant: NEC Corporation, Tokyo (JP)

(72) Inventor: Kentaro Sonoda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 203 days.

(21) Appl. No.: 17/918,157

(22) PCT Filed: Apr. 24, 2020

(86) PCT No.: PCT/JP2020/017709
§ 371 (c)(1),
(2) Date: Oct. 11, 2022

(87) PCT Pub. No.: WO2021/214982
PCT Pub. Date: Oct. 28, 2021

(65) Prior Publication Data
US 2023/0134937 A1    May 4, 2023

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .............. G06Q 10/0875; G06F 21/577; G06F 2221/034
See application file for complete search history.

(56) References Cited

U.S. PATENT DOCUMENTS

| | | | | |
|---|---|---|---|---|
| 5,796,614 | A * | 8/1998 | Yamada | G06Q 10/0875 700/106 |
| 7,043,324 | B2 * | 5/2006 | Woehler | G06Q 10/0875 703/2 |
| 10,462,009 | B1 * | 10/2019 | Shiramshetti | H04L 41/12 |
| 10,558,809 | B1 * | 2/2020 | Joyce | G06N 5/046 |
| 11,516,222 | B1 * | 11/2022 | Srinivasan | G06F 21/577 |

(Continued)

FOREIGN PATENT DOCUMENTS

| | | | |
|---|---|---|---|
| JP | 10228396 | A * | 8/1998 |
| JP | 2004-102479 | A | 4/2004 |

(Continued)

OTHER PUBLICATIONS

Software Bill of Materials (Year: 2024).*

(Continued)

*Primary Examiner* — Samson B Lemma
*Assistant Examiner* — Richard W Cruz-Franqui

(57) ABSTRACT

In order to appropriately detect flaws in a structure related to security of a system related to at least one of software and hardware, a security inspection apparatus includes an obtaining unit that obtains one or more pieces of configuration information related to configuration of a system to be inspected in security inspection, the system being related to at least one of software and hardware, a determining unit that determines whether or not each of the one or more pieces of configuration information is associated with any of one or more types of security functions set as inspection items for the security inspection, and a generating unit that generates information related to the determination.

10 Claims, 11 Drawing Sheets

(56) References Cited

U.S. PATENT DOCUMENTS

| | | | | |
|---|---|---|---|---|
| 11,637,869 | B2* | 4/2023 | Crabtree | H04L 63/1425 |
| | | | | 726/22 |
| 2002/0194160 | A1* | 12/2002 | Garrow | G06Q 10/1097 |
| 2005/0283823 | A1* | 12/2005 | Okajo | G06F 21/604 |
| | | | | 726/1 |
| 2006/0282350 | A1* | 12/2006 | Lind | G06Q 10/0875 |
| | | | | 705/29 |
| 2007/0044075 | A1* | 2/2007 | Koning | G06F 8/70 |
| | | | | 717/122 |
| 2007/0061124 | A1* | 3/2007 | Van Huben | G06F 30/33 |
| | | | | 703/16 |
| 2007/0240154 | A1* | 10/2007 | Gerzymisch | G06Q 10/0875 |
| | | | | 717/174 |
| 2008/0033846 | A1* | 2/2008 | Rehrauer | G06Q 30/00 |
| | | | | 705/28 |
| 2009/0136729 | A1 | 5/2009 | Hashimoto et al. | |
| 2009/0138729 | A1* | 5/2009 | Hashimoto | G06F 21/54 |
| | | | | 713/193 |
| 2010/0070390 | A1* | 3/2010 | Komejan | G06Q 10/0875 |
| | | | | 705/28 |
| 2010/0077444 | A1* | 3/2010 | Forristal | G06F 21/577 |
| | | | | 726/1 |
| 2011/0307353 | A1* | 12/2011 | Ringl | G06Q 30/0635 |
| | | | | 705/26.81 |
| 2012/0036049 | A1* | 2/2012 | Gerzymisch | G06Q 10/0875 |
| | | | | 705/29 |
| 2012/0079559 | A1 | 3/2012 | Reznik et al. | |
| 2013/0054427 | A1* | 2/2013 | Kageyama | G06Q 40/10 |
| | | | | 705/29 |
| 2013/0097357 | A1* | 4/2013 | Li | G06F 8/447 |
| | | | | 711/6 |
| 2014/0373160 | A1* | 12/2014 | Shigemoto | G06F 21/577 |
| | | | | 726/25 |
| 2015/0281283 | A1* | 10/2015 | Ashino | G06F 21/57 |
| | | | | 726/1 |
| 2015/0294107 | A1* | 10/2015 | Ashino | G06F 21/31 |
| | | | | 726/18 |
| 2015/0302202 | A1 | 10/2015 | Yamamoto | |
| 2016/0142433 | A1 | 5/2016 | Nasu | |
| 2018/0285572 | A1* | 10/2018 | Hanner | G06F 21/577 |
| 2019/0080095 | A1* | 3/2019 | Usuba | G06Q 10/0635 |
| 2019/0392140 | A1* | 12/2019 | Kawakita | G06N 3/045 |
| 2020/0045082 | A1* | 2/2020 | Hu | H04L 63/20 |
| 2020/0201620 | A1* | 6/2020 | Beard | G06F 8/61 |
| 2021/0014263 | A1* | 1/2021 | Soroush | G06N 3/04 |
| 2021/0056508 | A1* | 2/2021 | Lassalle | G06Q 10/101 |
| 2021/0297439 | A1* | 9/2021 | Hicks | G06F 11/26 |
| 2021/0336969 | A1* | 10/2021 | Bonney | G06F 21/577 |
| 2022/0394053 | A1* | 12/2022 | Sorani | G06F 21/57 |
| 2023/0229788 | A1* | 7/2023 | Pieno | G06F 16/24552 |
| | | | | 726/25 |
| 2024/0015175 | A1* | 1/2024 | Hakala | H04L 63/102 |
| 2024/0070290 | A1* | 2/2024 | Koike | G06F 21/577 |
| 2024/0080329 | A1* | 3/2024 | Reed | G06F 16/9038 |
| 2024/0160746 | A1* | 5/2024 | Kamimura | G06F 21/57 |

FOREIGN PATENT DOCUMENTS

| | | |
|---|---|---|
| JP | 2007-141169 A | 6/2007 |
| JP | 2008-262311 A | 10/2008 |
| JP | 2009-129206 A | 6/2009 |
| JP | 2013-008304 A | 1/2013 |
| JP | 2014-233078 A | 12/2014 |
| JP | 2016-095831 A | 5/2016 |
| JP | 2019-003309 A | 1/2019 |
| WO | 2014/050431 A1 | 4/2014 |

OTHER PUBLICATIONS

NPL Search History (Year: 2024).*
Written opinion for PCT Application No. PCT/JP2020/017709, mailed on Sep. 24, 2020 with English translation.
International Search Report for PCT Application No. PCT/JP2020/017709, mailed on Sep. 24, 2020.
Written opinion for PCT Application No. PCT/JP2020/017709, mailed on Sep. 24, 2020.

* cited by examiner

| PN | DESCRIPTION |
|---|---|
| 0001 | LOG-IN |
| 0002 | AUTHENTICATION |
| 0003 | ESCAPE PROCESSING |
| ... | ... |

310

| PS | CONFIGURATION |
|---|---|
| SOFTWARE A | PN0001 |
| | PN0002 |
| | PN0003 |
| SOFTWARE B | PN0002 |
| ... | ... |

| P S | CONFIGURATION | DESCRIPTION (PN) |
|---|---|---|
| SOFTWARE A | P N 0 0 0 1 | LOG-IN |
| | P N 0 0 0 2 | AUTHENTICATION |
| | P N 0 0 0 3 | ESCAPE |
| SOFTWARE B | P N 0 0 0 2 | AUTHENTICATION |
| . . . | . . . | . . . |

| LARGE ITEM | SMALL ITEM | REPRESENTATION |
|---|---|---|
| AUTHENTICATION | PASSWORD AUTHENTICATION | password, pw, pwa |
| | MULTI-FACTOR AUTHENTICATION | 2fa |
| | TOKEN AUTHENTICATION | one time, password, token |
| | FACE AUTHENTICATION | Face Recognition, bio |
| ENCRYPTION | AES | crypt |
| | 3DES | crypt |
| PERSONAL INFORMATION DELETION | PERSONAL INFORMATION DETERMINATION | pi, personal, info |
| ESCAPE PROCESSING | CHARACTER STRING PROCESSING | escape, specialchar |
| ... | ... | ... |

Fig. 5

SECURITY INSPECTION APPARATUS, SECURITY INSPECTION METHOD, AND PROGRAM

This application is a National Stage Entry of PCT/JP2020/017709 filed on Apr. 24, 2020, the contents of all of which are incorporated herein by reference, in their entirety.

TECHNICAL FIELD

The present invention relates to a security inspection apparatus, a security inspection method, and a program that perform security inspection of a system related to at least one of software and hardware.

BACKGROUND ART

A service of performing security inspection of a system including software, hardware, and the like has been provided. For example, by using such a service, a company can recognize flaws and vulnerability in security of a system (for example, a web system that executes data processing in response to access from a terminal) owned by the company. The company can take countermeasures in security, based on recognized information and the like.

In the security inspection described above, for example, there is a service, referred to as vulnerability assessment, of inspecting whether or not there is vulnerability related to an operating system (OS) and applications used in a system as described above.

For example, PTL 1 discloses that a function or the like described in a source code and known vulnerability information are compared, and when the comparison succeeds, it is determined that the function or the like described in the source code has vulnerability. PTL 2 describes that vulnerability inspection items based on invariably the latest vulnerability information are prepared by comparing a plurality of pieces of vulnerability information used in a vulnerability inspection tool with each other, and vulnerability inspection is carried out accurately and simply.

Further, PTL 3 discloses that a new participant in a network or a system performs self-check related to security for a system to be connected or the like and provides check results to an administrator of the network or the system, and the administrator evaluates the results of the self-check to determine whether or not connection is accepted or not.

Further, PTL 4 describes that reduction of inspection time and comprehensiveness of inspection are secured by performing model inspection using a model specialized in security inspection of a web application.

CITATION LIST

Patent Literature

[PTL 1] JP 2019-003309 A
[PTL 2] JP 2004-102479 A
[PTL 3] JP 2014-233078 A
[PTL 4] JP 2008-262311 A

SUMMARY

Technical Problem

Regarding the vulnerability assessment described above, in many cases, inspection is performed mainly using an inspection tool and software, and thus automation can be achieved substantially. In such inspection using a vulnerability assessment tool and software, known vulnerability can be promptly and comprehensively inspected and detected.

However, there is a problem in difficulty of detecting flaws in a structure related to security other than vulnerability, i.e., flaws in a structure such as security architecture or security design of a system, such as whether or not there is two-factor authentication and an email transmission function at the time of registration of personal information.

An example object of the present invention is to provide a security inspection apparatus, a security inspection method, and a program that enable appropriate detection of flaws in a structure related to security of a system related to at least one of software and hardware.

Solution to Problem

According to one aspect of the present invention, a security inspection apparatus includes: an obtaining unit configured to obtain one or more pieces of configuration information related to configuration of a system to be inspected in security inspection, the system being related to at least one of software and hardware; a determining unit configured to determine whether or not each of the one or more pieces of configuration information is associated with any of one or more types of security functions set as inspection items for the security inspection; and a generating unit configured to generate information related to the determination.

According to one aspect of the present invention, a security inspection method includes: obtaining one or more pieces of configuration information related to configuration of a system to be inspected in security inspection, the system being related to at least one of software and hardware; determining whether or not each of the one or more pieces of configuration information is associated with any of one or more types of security functions set as inspection items for the security inspection; and generating information related to the determination.

According to one aspect of the present invention, a program for causing a computer to execute: obtaining one or more pieces of configuration information related to configuration of a system to be inspected in security inspection, the system being related to at least one of software and hardware; determining whether or not each of the one or more pieces of configuration information is associated with any of one or more types of security functions set as inspection items for the security inspection; and generating information related to the determination.

Advantageous Effects of Invention

According to one aspect of the present invention, flaws in a structure related to security of a system related to at least one of software and hardware can be appropriately detected. Note that, according to the present invention, instead of or together with the above effects, other effects may be exerted.

BRIEF DESCRIPTION OF THE DRAWINGS

FIG. 3 is a diagram illustrating a specific example of a BOM configuring pieces of software for implementing a web system:

FIG. 4 is a diagram illustrating a specific example of a table column 400 generated from information related to the BOM:

FIG. 5 is a diagram illustrating a specific example of a checklist 500 stored in the security inspection apparatus 100a (storage unit 120);

FIG. 9 is an explanatory diagram for describing a flow of overall processing of the security inspection apparatus 100a:

DESCRIPTION OF THE EXAMPLE EMBODIMENTS

Figure 1:
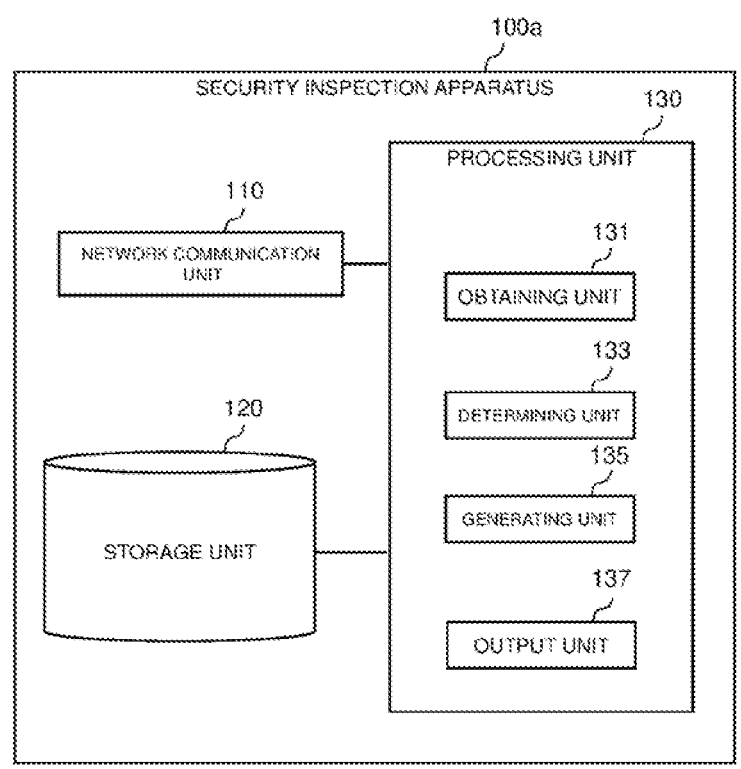
FIG. 1 is a block diagram illustrating an example of a schematic configuration of a security inspection apparatus 100a according to a first example embodiment.

Hereinafter, example embodiments of the present invention will be described in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Example Embodiments of Present Invention
2. First Example Embodiment
   2.1. Configuration of Security Inspection Apparatus 100a
   2.2. Operation Example
   2.3. Example Alteration
3. Second Example Embodiment
   3.1. Configuration of Security Inspection Apparatus 100c
   3.2. Operation Example
4. Other Example Embodiments <<1. Overview of Example Embodiments of Present Invention>>

First, an overview of example embodiments of the present invention will be described.

(1) Technical Issue

A service of performing security inspection of a system including software, hardware, and the like has been provided. For example, by using such a service, a company can recognize flaws and vulnerability in security of a system (for example, a web system that executes data processing in response to access from a terminal) owned by the company. The company can take countermeasures in security, based on recognized information and the like.

In the security inspection described above, for example, there is a service, referred to as vulnerability assessment, of inspecting whether or not there is vulnerability related to an operating system (OS) and applications used in a system as described above.

Regarding the vulnerability assessment described above, in many cases, inspection is performed mainly using an inspection tool and software, and thus automation can be achieved substantially. In such inspection using a vulnerability assessment tool and software, known vulnerability can be promptly and comprehensively inspected and detected.

However, there is a problem in difficulty of detecting flaws in a structure related to security other than vulnerability, i.e., flaws in a structure such as security architecture or security design of a system, such as whether or not there is two-factor authentication and an email transmission function at the time of registration of personal information.

In view of this, the present example embodiment has an example object to appropriately detect flaws in a structure related to security of a system related to at least one of software and hardware. More specifically, the example object is to automatically detect flaws in the structure of the system, such as security architecture or design that is difficult to be detected with a known vulnerability assessment tool or software.

(2) Technical Features

In the example embodiment of the present invention, one or more pieces of configuration information related to configuration of a system to be inspected in security inspection are obtained, the system being related to at least one of software and hardware, whether or not each of the one or more pieces of configuration information is associated with any of one or more types of security functions set as inspection items for the security inspection is determined, and information related to the determination is generated.

With this, for example, flaws in a structure related to security of a system related to at least one of software and hardware can be appropriately detected. Note that the technical features described above are merely a specific example of the example embodiments of the present invention, and as a matter of course, the example embodiments of the present invention are not limited to the technical features described above.

2. First Example Embodiment

Subsequently, with reference to FIG. 1 to FIG. 10, a first example embodiment will be described.

<2.1. Configuration of Security Inspection Apparatus 100a>

With reference to FIG. 1, an example of a configuration of a security inspection apparatus 100a according to the first example embodiment will be described. FIG. 1 is a block diagram illustrating an example of a schematic configuration of a security inspection apparatus 100a according to the first example embodiment. With reference to FIG. 1, the security inspection apparatus 100a includes a network communication unit 110, a storage unit 120, and a processing unit 130.

(1) Network Communication Unit 110

The network communication unit 110 receives a signal from a network, and transmits a signal to the network.

(2) Storage Unit 120

The storage unit 120 temporarily or permanently stores a program (instructions) and parameters for operations of the security inspection apparatus 100a as well as various data. The program includes one or more instructions for the operations of the security inspection apparatus 100a.

(3) Processing Unit 130

The processing unit 130 provides various functions of the security inspection apparatus 100a. The processing unit 130 includes an obtaining unit 131, a determining unit 133, a generating unit 135, and an output unit 137. Note that the processing unit 130 may further include other constituent elements in addition to these constituent elements. In other words, the processing unit 130 may also perform operations other than the operations of these constituent elements. Specific operations of the obtaining unit 131, the determining unit 133, the generating unit 135, and the output unit 137 will be described later in detail.

(4) Implementation Example

The network communication unit 110 may be implemented with a network adapter and/or a network interface card, and the like. The storage unit 120 may be implemented with a memory (for example, a nonvolatile memory and/or a volatile memory) and/or a hard disk, and the like. The processing unit 130 may be implemented with one or more processors. The obtaining unit 131, the determining unit 133, the generating unit 135, and the output unit 137 may be implemented with the same processor, or may be separately implemented with different processors. The memory (storage unit 120) may be included in the one or more processors, or may be provided outside the one or more processors.

The security inspection apparatus 100a may include a memory that stores a program (instructions), and one or more processors that can execute the program (instructions). The one or more processors may execute the program to thereby perform operations of the processing unit 130 (operations of the obtaining unit 131, the determining unit 133, the generating unit 135, and/or the output unit 137). The program may be a program for causing the processor(s) to execute the operations of the processing unit 130 (operations of the obtaining unit 131, the determining unit 133, the generating unit 135, and/or the output unit 137).

<2.2. Operation Example>

Next, an operation example according to the first example embodiment will be described.

According to the first example embodiment, the security inspection apparatus 100a (obtaining unit 131) obtains one or more pieces of configuration information related to configuration of a system to be inspected in security inspection, the system being related to at least one of software and hardware. The security inspection apparatus 100a (determining unit 133) determines whether or not each of the one or more pieces of configuration information is associated with any of one or more types of security functions set as inspection items for the security inspection. The security inspection apparatus 100a (generating unit 135) generates information related to the determination.

The system is a system to be inspected, which includes at least one of software and hardware. More specifically, the system is a web system including software resources and/or hardware resources for executing storing, processing, and the like of data in response to access from a terminal, for example. In order to ensure security, the web system has various security functions such as authentication and encryption.

In the present operation example, description will be given with reference to a web system as a specific example of the system. The present operation example may be applied not only to such a web system as above but to any system as long as the system is related to at least one of software and hardware.

For example, from the perspective of reuse of materials and the like, it is predicted that information related to the configuration of the web system includes names representing the functions of the web system, comments, and the like. According to the first example embodiment, flaws in the structure related to the security of the web system can be appropriately detected based on such prediction.

In other words, according to the first example embodiment, by determining whether or not the pieces of configuration information related to the configuration of the web system are associated with the security functions set as the inspection items, flaws in the structure related to the security of the web system can be appropriately detected.

(1) Configuration Information

Specifically, each of the one or more pieces of configuration information indicates text data related to the configuration of the web system (for example, character string data of keywords related to the configuration of the web system).

In this case, the determination regarding the association is performed through comparison between text data indicated by each of the one or more pieces of configuration information and text data related to each of the one or more types of security functions set as the inspection items for the security inspection. The comparison is, for example, determination as to whether or not keywords to be compared satisfy a predetermined conformity condition (matching, similarity, or the like). For example, for the similarity determination between the keywords, for example, any method such as edit distance is used.

In other words, when the comparison between the text data indicated by the configuration information and any one piece of text data out of the text data (for example, keywords) representing any one security function indicates positive results, the security inspection apparatus 100a (determining unit 133) determines that the configuration information related to the configuration of the web system is associated with the security function for which the comparison indicates positive results. In contrast, when the comparison indicates negative results, the security inspection apparatus 100a (determining unit 133) determines that the configuration information related to the configuration of the web system is not associated with any of the security functions.

(1-1) Information Related to Configuration of Source Code

The one or more pieces of configuration information include information related to configuration of a source code for operating the web system. For example, the source code may be a text file in which a program for operating the web system is described, a data file exported from a program created using an integrated development environment (also referred to as an IDE), or any form of data file.

The information related to the configuration of the source code is, for example, text data, such as a function name and a comment sentence, that can be extracted from the source code. For example, when the source code is received by the network communication unit 110, the security inspection apparatus 100a (obtaining unit 131) extracts (obtains), from the source code, text data such as a function name and a comment sentence included in the source code.

Figure 2:
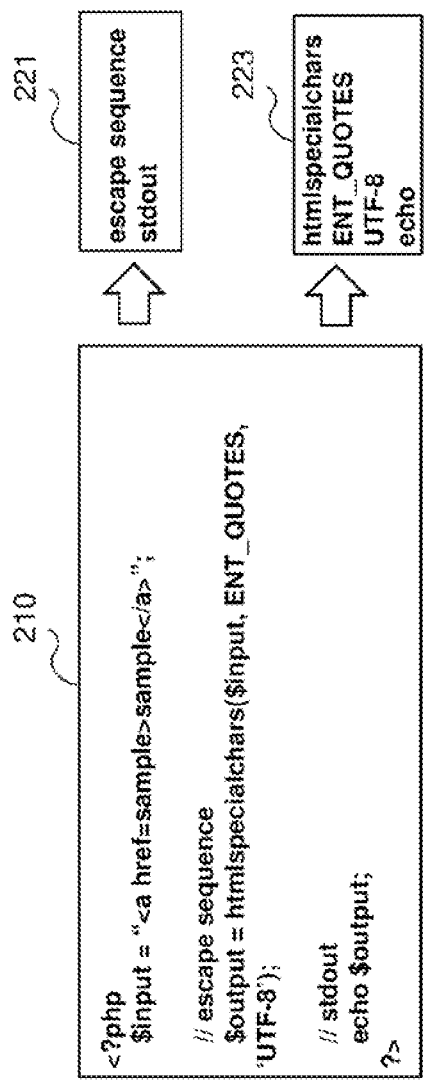
FIG. 2 is a diagram illustrating a specific example of processing for extracting each of a function name 221 and a comment sentence 223 from a source code 210.

FIG. 2 is a diagram illustrating a specific example of processing for extracting each of a function name 221 and a comment sentence 223 from a source code 210. With reference to FIG. 2, the security inspection apparatus 100a (obtaining unit 131) extracts, from the source code 210 described in the php language, a character string (function name 221) corresponding to a function in the source code 210 and a character string (comment sentence 223) corresponding to a comment.

More specifically, processing of extracting the function name 221 is performed as follows. Specifically, the security inspection apparatus 100a (obtaining unit 131) can search for and extract the function name 221 from the source code 210 by using the official function reference (manual) of the php language as a search keyword, for example. In the extraction processing, not only the function name 221 but a variable and the like used for the function may be extracted as well.

The processing for extracting the comment sentence 223 described above is performed as follows. Specifically, the security inspection apparatus 100a (obtaining unit 131) can extract, as the comment sentence 223, a character string that follows a character string ("//" described in the source code 210) expressing a comment sentence in the php language.

(1-2) Information Related to Bills of Materials

The one or more pieces of configuration information may further include information related to a bill of materials (hereinafter also referred to as a BOM) configuring the web system. For example, the BOM is information in which listability of a plurality of materials configuring software and hardware for implementing the web system is ensured. In other words, the BOM is information that lists pieces of material information necessary for implementation and assembly in product development of the software and hardware described above.

FIG. 3 is a diagram illustrating a specific example of a BOM configuring pieces of software for implementing the web system. With reference to FIG. 3, the BOM includes a table 310 for Parts Number (PN) and a table 320 for Part Structure (PS). The PN 310 is a number (identifier) allowing identification of each of the materials. The PS 320 is information indicating how the material associated with the identifier is configured.

Specifically, the example of the table 310 for the PN illustrated in FIG. 3 indicates that the function of the material corresponding to PN0001 has a function name "log-in processing", the function of the material corresponding to PN0002 has a function name "authentication processing", and the function of the material corresponding to PN0003 has a function name "escape processing". The example of the table 320 for PS illustrated in FIG. 3 indicates that software A is configured with three materials respectively associated with PN0001 to PN0003, and software B is configured with one material associated with PN0002.

For example, when the network communication unit 110 receives information related to the BOM, the security inspection apparatus 100a (obtaining unit 131) obtains the information related to the BOM. Subsequently, the security inspection apparatus 100a (obtaining unit 131) generates a table column in which the pieces of software indicated by the PS, the PN indicated by the PS, and the function name related to the PN are associated with each other. FIG. 4 is a diagram illustrating a specific example of a table column 400 generated from the information related to the BOM. Data of the table column 400 is provided to the storage unit 120 and the determining unit 133, for example. Note that the information related to the BOM need not be limited to the form as illustrated in FIG. 4, and may be stored (retained) in the security inspection apparatus 100a (storage unit 120) or the like in any form.

(2) Inspection Items

Specifically, the inspection items are used to confirm whether or not each of the one or more types of security functions is included. A plurality of inspection items related to each of the one or more types of security functions may be, for example, listed in a checklist stored in the security inspection apparatus 100a (storage unit 120).

Specifically, the checklist is a list of inspection items associated with the security functions to be confirmed as to whether or not there is a flaw in security. For example, the inspection items are keywords associated with the security functions.

(2-1) Item Sets

Each of the one or more types of security functions may belong to one or more item sets out of a plurality of item sets. In other words, the one or more types of security functions may be categorized into respective item sets, based on attributes of the functions or the like, such as "authentication", "encryption", and "personal information deletion".

In addition, the plurality of item sets may include a plurality of first item sets, and a plurality of second item sets subdivided from each of the plurality of first item sets. In this case, each of the one or more types of security functions belongs to one first item set out of the plurality of first item sets, and one second item set out of the plurality of second item sets subdivided from the one first item set.

As a specific example, each of the first item sets may be referred to as a "large item", and each of the second item sets may be referred to as a "small item". For example, when a large item "authentication" is set, the large item "authentication" is subdivided into a total of four small items, specifically "multi-factor authentication", "password authentication", "token authentication", and "face authentication".

Specific Example of Checklist

FIG. 5 is a diagram illustrating a specific example of a checklist 500 stored in the security inspection apparatus 100a (storage unit 120). With reference to FIG. 5, the checklist 500 may be, for example, a table column in which a plurality of (for example, four types of) large items 510, a plurality of small items 520 subdivided from each of the large items, and representations 530 (a function name, a comment sentence, a function name associated with the PN in the BOM, and the like) associated with the security functions belonging to each of the small items are associated with each other. For example, "password authentication" set in the small item 520 is associated with "password, pw, pwa" set in the representation 530. The checklist need not be limited to the form as illustrated in FIG. 5, and may be retained in the security inspection apparatus 100a (storage unit 120) or the like in any form.

(2-2) Example of Determination Processing Using Checklist

Figure 6:
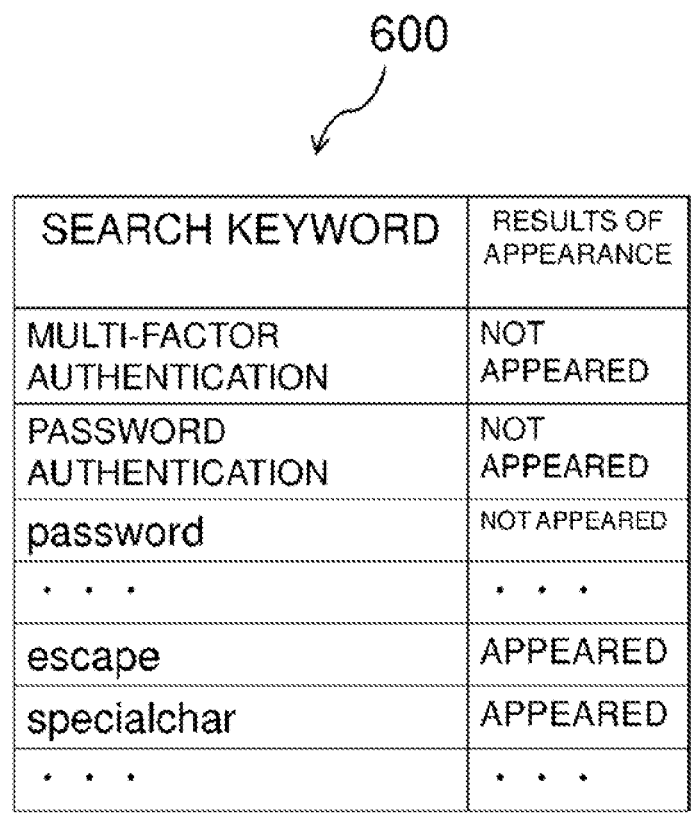
FIG. 6 is an explanatory diagram for describing determination processing performed by the security inspection apparatus 100a (determining unit 133) by using the checklist 500 described above.

FIG. 6 is an explanatory diagram for describing determination processing performed by the security inspection apparatus 100a (determining unit 133) by using the checklist 500 described above.

The security inspection apparatus 100a (determining unit 133) sets each of the representations 530 in the checklist 500 stored in the storage unit 120 to a search keyword, and determines whether or not each piece of configuration information (a function name, a comment sentence, a function name associated with the PN in the BOM, and the like) obtained by the obtaining unit 131 comes up (appears). Next, the security inspection apparatus 100a (determining unit 133) obtains information 600 indicating whether or not associated configuration information comes up (appears) for each of the search keywords and for each of the items to which the search keywords belong as illustrated in FIG. 6, and provides the information to the generating unit 135.

(3) Information Related to Determination

The information related to the determination generated by the security inspection apparatus 100a (generating unit 135) may include information indicating whether or not each of the one or more pieces of configuration information is associated with any of the one or more types of security functions.

As an example, the security inspection apparatus 100a (generating unit 135) may generate the information (information 600 illustrated in FIG. 6) provided from the determining unit 133 as described above as the information related to the determination.

Information Indicating Number of Appearances

The information related to the determination generated by the security inspection apparatus 100a (generating unit 135) may include information indicating the number of appearances of the configuration information associated with the security functions belonging to a corresponding item set in each of the plurality of item sets.

As an example, the security inspection apparatus 100a (generating unit 135) refers to the information (information 600 illustrated in FIG. 6) provided from the determining unit 133 as described above, and generates, for each of the plurality of large items, information indicating the number of appearances of the configuration information (for example, password, 2fa, one time, and the like) associated with the security functions belonging to a corresponding large item (for example, "authentication").

Figure 7:
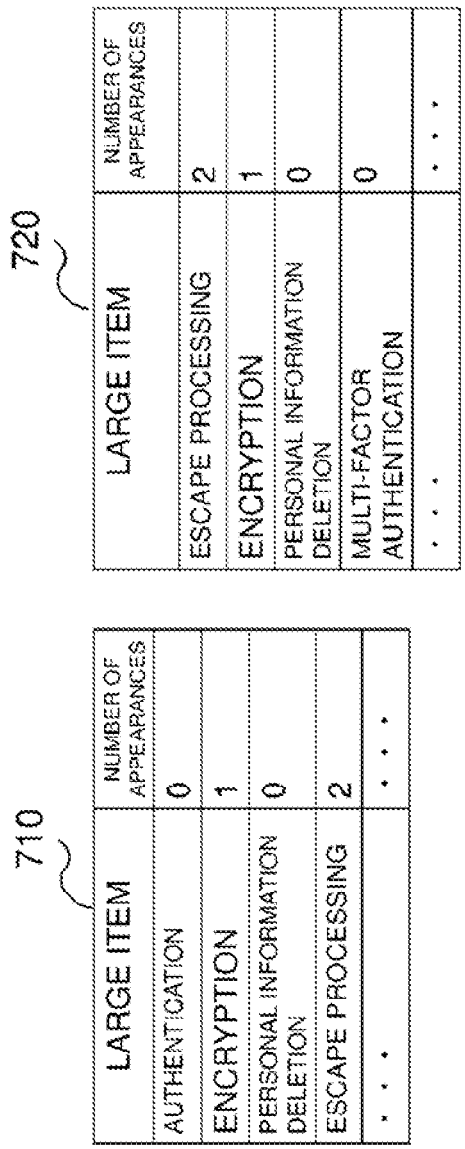
FIG. 7 is a diagram illustrating table columns 710 and 720 according to a specific example of the information indicating the number of appearances.

FIG. 7 is a diagram illustrating table columns 710 and 720 according to a specific example of the information indicating the number of appearances.

The table column 710 indicates that the number of appearances of the security function belonging to the large item "authentication" is "0", the number of appearances of the security function belonging to the large item "encryption" is "1", the number of appearances of the security function belonging to the large item "personal information deletion" is "0", and the number of appearances of the security function belonging to the large item "escape processing" is "2".

Such a table column 710 illustrated in FIG. 7 is visibly displayed to a user (inspector) or the like by the security inspection apparatus 100a (output unit 137). With this, the user of the security inspection apparatus 100a can recognize the number of security functions included the web system to be inspected for each large item. For example, when this is applied to the example illustrated in FIG. 7, the user can recognize that, in the web system, authentication may not have been implemented, character string escape processing may have been implemented, and the like.

The information indicating the number of appearances need not be limited to the table column 710 described above, and for example, data shaping processing for enabling the user to more easily refer to inspection results may be performed. For example, the table column 720 illustrated in FIG. 7 is a table column to which the data shaping processing is performed, which is rearranged from the table column 710 such that the large items are listed in descending order from the one having the highest number of appearances.

Generation of Information in Consideration of Appearance of Configuration Information Belonging to Each of Subdivided Sets The information related to the determination generated by the security inspection apparatus 100a (generating unit 135) may include information indicating whether or not there is configuration information associated with the security function belonging to each of a predetermined number or more of second item sets (small items) out of a plurality of second item sets (small items) subdivided from the first item set (large item).

For example, the large item "authentication" illustrated in FIG. 5 is focused. The security inspection apparatus 100a (generating unit 135) determines whether or not the following condition is satisfied based on the information provided from the determining unit 133. The condition is that configuration information (a function name, a comment sentence, information related to the BOM) belonging to each of four types (predetermined number) or more of small sets out of a total of six types of small items "password authentication, multi-factor authentication, token authentication, and face authentication" subdivided from the large item "authentication" has come up. Then, when the condition is satisfied, information allocating "satisfactory" or the like to the large item "authentication" may be generated as the information related to the determination.

The large item "encryption" illustrated in FIG. 5 is focused. The security inspection apparatus 100a (generating unit 135) determines whether or not the following condition is satisfied based on the information provided from the determining unit 133. The condition is that configuration information (a function name, a comment sentence, information related to the BOM) belonging to each of one type (predetermined number), being half the number, or more of small sets out of a total of two types of small items "AES and 3DES" subdivided from the large item "encryption" has come up. Then, when the condition is not satisfied, information allocating "defective (or flaw)" or the like to the large item "encryption" may be generated as the information related to the determination.

Note that the predetermined number need not be limited to the above example, and may be a total number of small items subdivided from one large item. For example, when the large item "authentication" is focused, the predetermined number may be "6".

When such information is output to be displayed on a web screen by the output unit 137, for example, a degree of appearance of the configuration information belonging to each of the small items can be presented to the user in an easy-to-understand form. For example, when there are a large number of small items in the checklist, search results obtained by the determining unit 133 can be presented in easier-to-understand form as compared to when information indicating the number of appearances of the configuration information is presented to the user for each small item.

Emphatic Display of Configuration Information

For example, the information related to the determination generated by the security inspection apparatus 100a (generating unit 135) may include position information of appearance of the configuration information (a function name, a comment sentence, or the like) associated with each of the search keywords in the source code.

Figure 8:
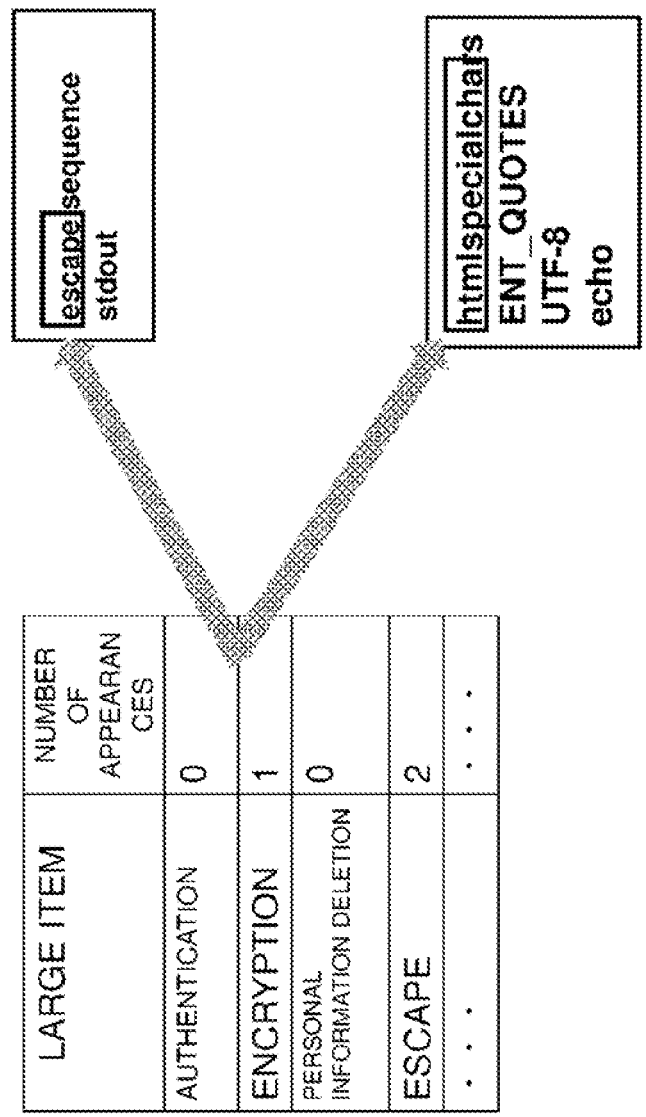
FIG. 8 is an explanatory diagram for describing processing related to emphatic display of configuration information.

FIG. 8 is an explanatory diagram for describing processing related to emphatic display of the configuration information. With reference to FIG. 8, the security inspection apparatus 100a (output unit 137) can visibly present the user with position information of appearance of the configuration information (a function name, a comment sentence, or the like) associated with each of the search keywords in the source code by using the position information included in the information related to the determination.

For example, in the example illustrated in FIG. 8, when click operation is performed on the inspection item "escape processing" on a web screen displayed by the security inspection apparatus 100a (output unit 137), a screen with emphatic display of a keyword to be searched in the source code is displayed on the web screen.

Additional Notes

The information related to the determination generated by the security inspection apparatus 100*a* (generating unit 135) is not limited to the example described above. For example, the information related to the determination may include information indicating whether or not the configuration information (for example, a function name and a comment sentence in the source code) associated with the search keyword appears in predetermined order.

Specifically, the security inspection apparatus 100*a* (generating unit 135) may determine whether or not the following condition is satisfied. The condition is that a function name associated with the search keyword appears in predetermined order in the source code. When the condition is satisfied, information indicating "security function of web system is satisfactory" may be generated as the information related to the determination. When the condition is not satisfied, information indicating "security function of web system is defective" may be generated as the information related to the determination.

(4) Flow of Processing

Figure 9:
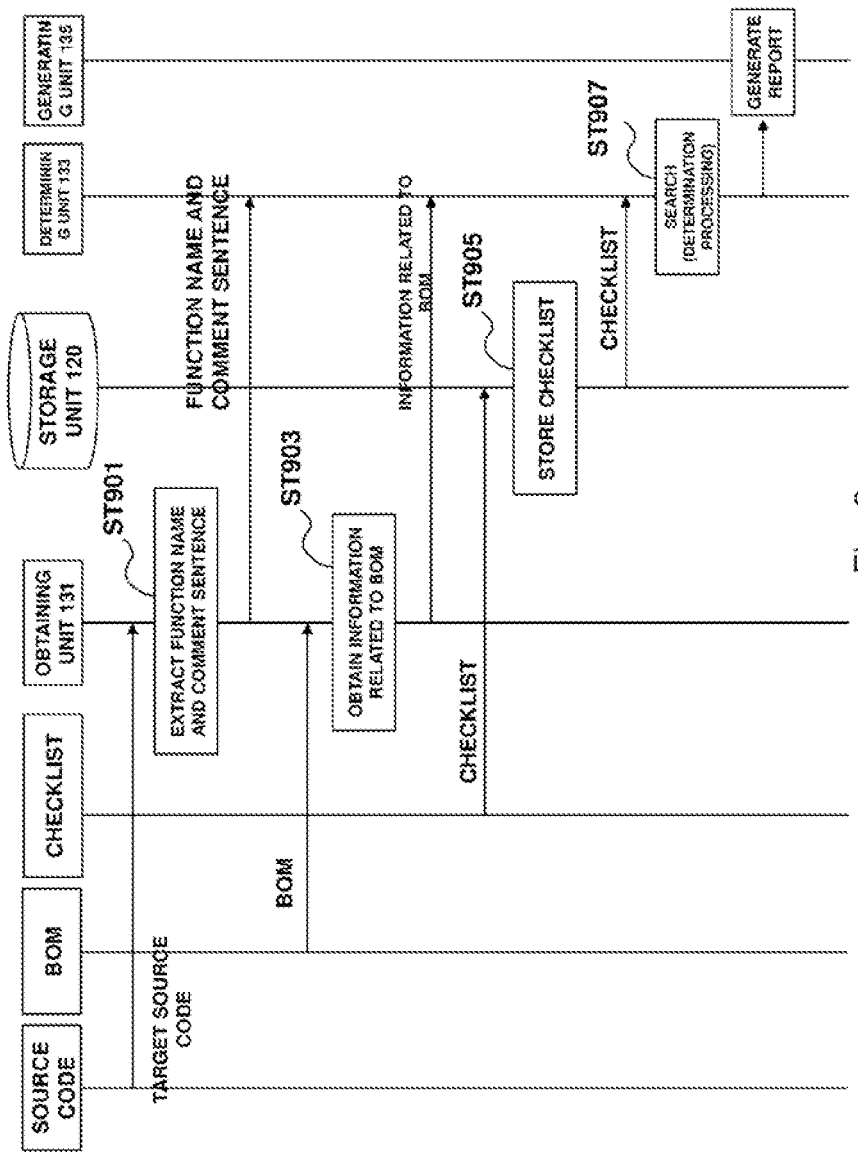

Next, with reference to FIG. 9, a flow of overall processing of the security inspection apparatus 100*a* will be described. FIG. 9 is an explanatory diagram for describing a flow of overall processing of the security inspection apparatus 100*a*.

With reference to FIG. 9, in Step ST901, for example, the security inspection apparatus 100*a* (obtaining unit 131) extracts, from a source code received by the network communication unit 110, a character string (function name) corresponding to a function in the source code and a character string (comment sentence) corresponding to a comment. The security inspection apparatus 100*a* (obtaining unit 131) provides information (for example, text data) indicating each of the extracted function name and comment sentence to the determining unit 133.

Next, in Step ST903, for example, the security inspection apparatus 100*a* (obtaining unit 131) obtains information related to a BOM received by the network communication unit 110. The security inspection apparatus 100*a* (obtaining unit 131) provides the obtained information related to the BOM to the determining unit 133.

Next, in Step ST905, for example, the security inspection apparatus 100*a* (storage unit 120) stores a checklist received by the network communication unit 110. For example, the security inspection apparatus 100*a* (storage unit 120) provides the checklist to the determining unit 133 in response to access from the determining unit 133.

Next, in Step ST907, the security inspection apparatus 100*a* (determining unit 133) sets each of the items and the representations indicated in the checklist stored in the storage unit 120 to a search keyword, and determines whether or not the information (a function name, a comment sentence, a function name associated with the PN in the BOM, and the like) provided by the obtaining unit 131 comes up. The security inspection apparatus 100*a* (determining unit 133) provides information indicating the determination results to the generating unit 135.

Next, in Step S909, the security inspection apparatus 100*a* (generating unit 135) generates report information (for example, information illustrated in FIG. 6 to FIG. 8 described above) that can be recognized by the user, based on the information indicating the determination results provided by the determining unit 133. For example, such report information is displayed on a web screen visible to the user by the output unit 137.

According to the processing illustrated in FIG. 9 above, the search processing is executed using a checklist listing keywords indicating security functions prepared in advance for the source code and the BOM related to the web system to be inspected in security inspection. Search results obtained through the search processing are output as the report information. The user (inspector) can refer to the report information, and easily confirm whether or not there is defectiveness (for example, a flaw) in architecture and design of security related to the web system to be inspected in security inspection.

<2.3. Example Alteration>

Figure 10:
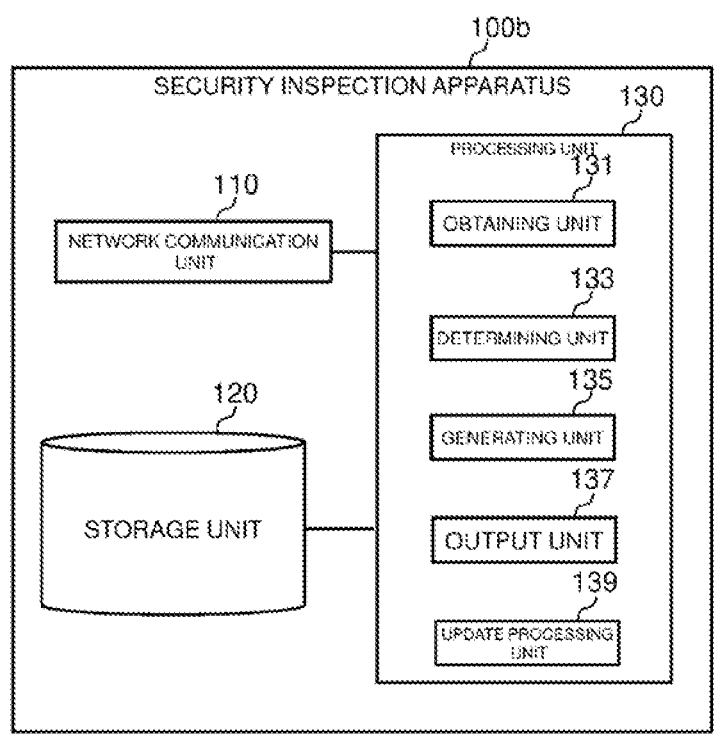
FIG. 10 is a block diagram illustrating an example of a schematic configuration of a security inspection apparatus 100b according to an example alteration.

Next, a first example embodiment according to an example alteration will be described. FIG. 10 is a block diagram illustrating an example of a schematic configuration of a security inspection apparatus 100*b* according to the example alteration. With reference to FIG. 10, the security inspection apparatus 100*b* is different from the security inspection apparatus 100*a* described above in that the processing unit 130 includes an update processing unit 139 that updates security functions to be set as inspection items for the security inspection. In the following, processing related to the update processing unit 139 will be described.

Specifically, the update processing unit 139 obtains document data related to a guideline of security disclosed by a government agency, a security related vendor, or the like by using the network communication unit 110, for example. Note that the document data to be obtained by the update processing unit 139 may be document data indicating a document of detailed specifications or the like of software for executing the web system to be inspected in security inspection.

Next, the update processing unit 139 extracts keywords to be newly set as the inspection items from the document data obtained as described above. Then, the update processing unit 139 newly registers the extracted keywords in a checklist, and thereby updates the checklist. More specifically, for example, when the checklist is categorized into "large item", "small item", and "representation" as illustrated in FIG. 5 described above, the update processing unit 139 extracts keywords related to each of the categories from the document data, and registers the extracted keywords in each of the categories. Note that the update processing unit 139 may determine whether or not the extracted keywords are similar to the keywords already registered in the checklist. For the similarity determination between the keywords, for example, any method such as edit distance is used. Only the keywords that are determined as "not similar" may be newly registered in the checklist.

Frequency of update of the checklist performed by the processing unit 139 may be, for example, set in advance according to user operation of the security inspection apparatus 100*b*, such as "once a month". The update processing unit 139 may constantly monitor new disclosure of various guidelines indicated by pieces of document data on a website or update of an existing guideline, and perform update processing of the checklist as described above at timing when the update processing unit 139 obtains these pieces of document data to be monitored.

The update processing unit 139 may extract representation (a function name and a comment sentence in a source code, information related to the BOM) that may be a search keyword out of data that can be obtained via the Internet, for example, by using a technique such as machine learning, and perform update processing of the checklist so that the extracted search keyword is included in the checklist.

As described above, according to the security inspection apparatus 100b according to the example alteration, by periodically or aperiodically referring to the document data indicating a guideline or the like of security disclosed by a government agency, a security related vendor, or the like, the checklist retained (stored) in the storage unit 120 is successively updated. With this, the security inspection apparatus 100b can perform inspection related to the security function, based on invariably the latest checklist.

3. Second Example Embodiment

Figure 11:
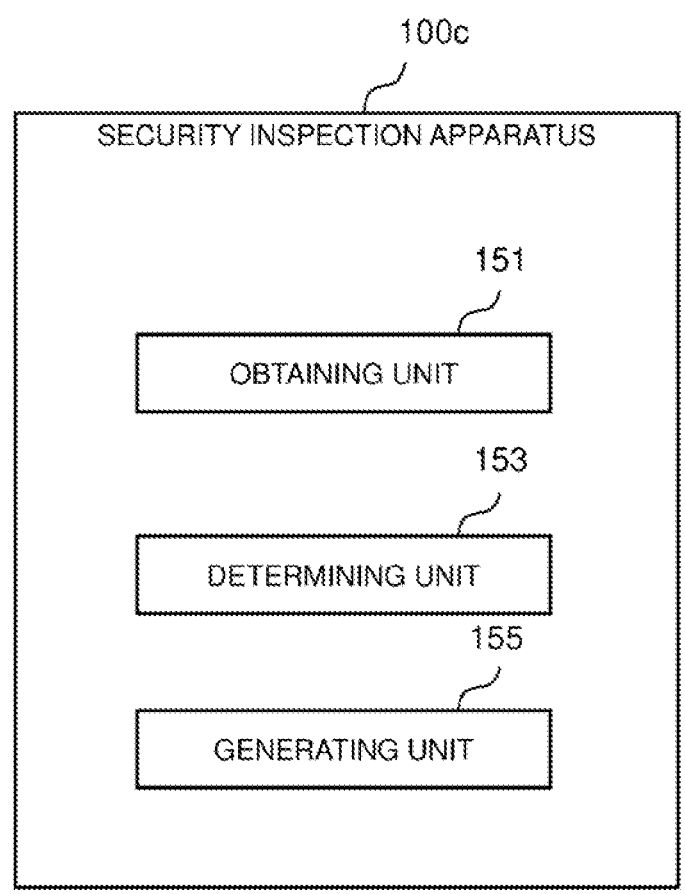
FIG. 11 is a block diagram illustrating an example of a schematic configuration of a security inspection apparatus 100c according to a second example embodiment.

Next, with reference to FIG. 11, a second example embodiment of the present invention will be described. While the first example embodiment described above is a specific example embodiment, the second example embodiment is a more generalized example embodiment.
<3.1. Configuration of Security Inspection Apparatus 100c>
FIG. 11 is a block diagram illustrating an example of a schematic configuration of a security inspection apparatus 100c according to the second example embodiment. With reference to FIG. 11, the security inspection apparatus 100c includes an obtaining unit 151, a determining unit 153, and a generating unit 155.

The obtaining unit 151, the determining unit 153, and the generating unit 155 may be implemented with one or more processors, and a memory (for example, a nonvolatile memory and/or a volatile memory) and/or a hard disk. The obtaining unit 151, the determining unit 153, and the generating unit 155 may be implemented with the same processor, or may be separately implemented with different processors. The memory may be included in the one or more processors, or may be provided outside the one or more processors.
<3.2. Operation Example>
An operation example according to the second example embodiment will be described.

According to the second example embodiment, the security inspection apparatus 100c (obtaining unit 151) obtains one or more pieces of configuration information related to configuration of a system to be inspected in security inspection, the system being related to at least one of software and hardware. The security inspection apparatus 100c (determining unit 153) determines whether or not each of the one or more pieces of configuration information is associated with any of one or more types of security functions set as inspection items for the security inspection. The security inspection apparatus 100c (generating unit 155) generates information related to the determination.
Relationship with First Example Embodiment As an example, the obtaining unit 151, the determining unit 153, and the generating unit 155 included in the security inspection apparatus 100c according to the second example embodiment may perform operations of the obtaining unit 151, the determining unit 153, and the generating unit 155 included in the security inspection apparatuses 100a and 100b according to the first example embodiment, respectively. In this case, description regarding the first example embodiment may also be applied to the second example embodiment. Note that the second example embodiment is not limited to this example.

The second example embodiment has been described above. According to the second example embodiment, by determining whether or not the pieces of configuration information related to the configuration of the system related to at least one of software and hardware are associated with the security functions set as the inspection items, flaws in the structure related to the security of the system can be appropriately detected.

4. Other Example Embodiments

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be executed in time series in the order described in the corresponding sequence diagram. For example, the steps in the processing may be executed in an order different from that described in the corresponding sequence diagram or may be executed in parallel. Some of the steps in the processing may be deleted, or more steps may be added to the processing.

An apparatus including constituent elements (e.g., the obtaining unit, the determining unit, and/or the generating unit) of the security inspection apparatus described in the Specification (e.g., one or more apparatuses (or units) among a plurality of apparatuses (or units) constituting the security inspection apparatus or a module for one of the plurality of apparatuses (or units)) may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such apparatuses, modules, methods, programs, and non-transitory computer readable recording media are also included in the present invention.

The whole or part of the example embodiments disclosed above can be described as, but not limited to, the following supplementary notes.

Supplementary Note 1

A security inspection apparatus comprising:
an obtaining unit configured to obtain one or more pieces of configuration information related to configuration of a system to be inspected in security inspection, the system being related to at least one of software and hardware;
a determining unit configured to determine whether or not each of the one or more pieces of configuration information is associated with any of one or more types of security functions set as inspection items for the security inspection; and a generating unit configured to generate information related to the determination.

Supplementary Note 2

The security inspection apparatus according to supplementary note 1, wherein each of the one or more pieces of configuration information indicates text data related to the configuration of the system, and the determination regarding the association is performed through comparison between text data indicated by each of the one or more pieces of configuration information and text data related to each of the one or more types of security functions set as the inspection items for the security inspection.

Supplementary Note 3

The security inspection apparatus according to supplementary note 1 or 2, wherein the one or more pieces of configuration information include information related to configuration of a source code for operating the system.

Supplementary Note 4

The security inspection apparatus according to any one of supplementary notes 1 to 3, wherein the one or more pieces of configuration information include information related to a bill of materials configuring the system.

Supplementary Note 5

The security inspection apparatus according to any one of supplementary notes 1 to 4, wherein the information related to the determination includes information indicating whether or not each of the one or more pieces of configuration information is associated with any of the one or more types of security functions.

Supplementary Note 6

The security inspection apparatus according to any one of supplementary notes 1 to 5, wherein each of the one or more types of security functions belongs to one or more item sets out of a plurality of item sets.

Supplementary Note 7

The security inspection apparatus according to supplementary note 6, wherein the information related to the determination includes information indicating number of appearances of the configuration information in each of the plurality of item sets, the one or more pieces of configuration information being associated with the one or more types of security functions belonging to a corresponding item set.

Supplementary Note 8

The security inspection apparatus according to supplementary note 6 or 7, wherein the plurality of item sets include a plurality of first item sets and a plurality of second item sets subdivided from each of the plurality of first item sets, and each of the one or more types of security functions belongs to one first item set out of the plurality of first item sets and one second item set out of the plurality of second item sets subdivided from the one first item set.

Supplementary Note 9

The security inspection apparatus according to supplementary note 8, wherein the information related to the determination includes information indicating whether or not there is a piece of configuration information associated with the one or more types of security functions belonging to each of a predetermined number or more of second item sets out of the plurality of second item sets subdivided from the one first item set.

Supplementary Note 10

The security inspection apparatus according to any one of supplementary notes 1 to 9, further comprising an update processing unit configured to update the one or more types of security functions to be set as the inspection items for the security inspection.

Supplementary Note 11

A security inspection method comprising:
obtaining one or more pieces of configuration information related to configuration of a system to be inspected in security inspection, the system being related to at least one of software and hardware;
determining whether or not each of the one or more pieces of configuration information is associated with any of one or more types of security functions set as inspection items for the security inspection; and generating information related to the determination.

Supplementary Note 12

A program for causing a computer to execute:
obtaining one or more pieces of configuration information related to configuration of a system to be inspected in security inspection, the system being related to at least one of software and hardware;
determining whether or not each of the one or more pieces of configuration information is associated with any of one or more types of security functions set as inspection items for the security inspection; and
generating information related to the determination.

INDUSTRIAL APPLICABILITY

Flaws in a structure related to security of a system related to at least one of software and hardware can be appropriately detected.

REFERENCE SIGNS LIST 100a, 100b, 100c Security Inspection Apparatus
131, 151 Obtaining Unit
133, 153 Determining Unit
135, 155 Generating Unit
137 Output Unit

What is claimed is:
1. A security inspection apparatus comprising:
a memory storing instructions; and
one or more processors configured to execute the instructions to:
  obtain one or more pieces of configuration information related to configuration of a system to be inspected in security inspection, the system being related to at least one of software and hardware;
  determine whether or not each of the one or more pieces of configuration information is associated with any of one or more types of security functions set as inspection items for the security inspection; and
  generate information related to the determination,
wherein each of the one or more types of security functions belongs to one or more item sets out of a plurality of item sets,
the plurality of item sets include a plurality of first item sets and a plurality of second item sets subdivided from each of the plurality of first item sets, and
each of the one or more types of security functions belongs to one first item set out of the plurality of first item sets and one second item set out of the plurality of second item sets subdivided from the one first item set.

2. The security inspection apparatus according to claim 1, wherein each of the one or more pieces of configuration information indicates text data related to the configuration of the system, and the determination regarding the association is performed through comparison between text data indicated by each of the one or more pieces of configuration information and text data related to each of the one or more types of security functions set as the inspection items for the security inspection.

3. The security inspection apparatus according to claim 1, wherein the one or more pieces of configuration information include information related to configuration of a source code for operating the system.

4. The security inspection apparatus according to claim 1, wherein the one or more pieces of configuration information include information related to a bill of materials configuring the system.

5. The security inspection apparatus according to claim 1, wherein the information related to the determination includes information indicating whether or not each of the one or more pieces of configuration information is associated with any of the one or more types of security functions.

6. The security inspection apparatus according to claim 1, wherein the information related to the determination includes information indicating number of appearances of the configuration information in each of the plurality of item sets, the one or more pieces of configuration information being associated with the one or more types of security functions belonging to a corresponding item set.

7. The security inspection apparatus according to claim 1, wherein the information related to the determination includes information indicating whether or not there is a piece of configuration information associated with the one or more types of security functions belonging to each of a predetermined number or more of second item sets out of the plurality of second item sets subdivided from the one first item set.

8. The security inspection apparatus according to claim 1, the one or more processors are configured to execute the instructions to update the one or more types of security functions to be set as the inspection items for the security inspection.

9. A security inspection method performed by a computer and comprising:

obtaining, by the computer, one or more pieces of configuration information related to configuration of a system to be inspected in security inspection, the system being related to at least one of software and hardware;

determining, by the computer, whether or not each of the one or more pieces of configuration information is associated with any of one or more types of security functions set as inspection items for the security inspection; and generating, by the computer, information related to the determination, wherein each of the one or more types of security functions belongs to one or more item sets out of a plurality of item sets, the plurality of item sets include a plurality of first item sets and a plurality of second item sets subdivided from each of the plurality of first item sets, and each of the one or more types of security functions belongs to one first item set out of the plurality of first item sets and one second item set out of the plurality of second item sets subdivided from the one first item set.

10. A non-transitory computer readable recording medium storing a program for causing a computer to execute:

obtaining one or more pieces of configuration information related to configuration of a system to be inspected in security inspection, the system being related to at least one of software and hardware;

determining whether or not each of the one or more pieces of configuration information is associated with any of one or more types of security functions set as inspection items for the security inspection; and generating information related to the determination, wherein each of the one or more types of security functions belongs to one or more item sets out of a plurality of item sets, the plurality of item sets include a plurality of first item sets and a plurality of second item sets subdivided from each of the plurality of first item sets, and each of the one or more types of security functions belongs to one first item set out of the plurality of first item sets and one second item set out of the plurality of second item sets subdivided from the one first item set.

* * * * *